United States Patent [19]

Inada et al.

[11] 4,411,406

[45] Oct. 25, 1983

[54] ELECTROMAGNETIC FLOW CONTROL VALVE ASSEMBLY

[75] Inventors: Masami Inada, Kariya; Isshi Nomura, Aichi, both of Japan

[73] Assignee: Aisin Seiki Kabushiki Kaisha, Kariya, Japan

[21] Appl. No.: 264,386

[22] Filed: May 18, 1981

[30] Foreign Application Priority Data

Jun. 4, 1980 [JP] Japan .................................. 55-75061

[51] Int. Cl.$^3$ ............................................. F16K 31/06
[52] U.S. Cl. ..................................... 251/129; 251/282
[58] Field of Search ........................ 251/129, 141, 282

[56] References Cited

U.S. PATENT DOCUMENTS

| | | | |
|---|---|---|---|
| 2,850,037 | 9/1958 | Van Eysbergen | 251/282 X |
| 3,009,678 | 11/1961 | Soderberg et al. | 251/282 X |
| 3,194,499 | 7/1965 | Noakes et al. | 251/282 X |
| 3,441,246 | 4/1969 | Lauppe et al. | 251/129 X |
| 4,240,266 | 12/1980 | Scrine et al. | 251/282 X |
| 4,314,585 | 2/1982 | Nishimiya et al. | 251/282 X |

Primary Examiner—Arnold Rosenthal
Attorney, Agent, or Firm—Sughrue, Mion, Zinn, Macpeak and Seas

[57] ABSTRACT

An electromagnetic flow control valve assembly includes a valve body having first and second ports and a valve member for controlling fluid communication between said first and second ports. An annular diaphragm is connected at its inner periphery to the valve member and at its outer periphery to the valve body so as to define with said valve body first and second chambers. The first chamber is in continuous fluid communication with the first port through a passage in the valve member while the second chamber is in continuous communication with the second port. The area of the diaphragm subjected to fluid pressure within the second chamber being equal to the effective area of the valve member subjected to fluid pressure within the second chamber to thereby offset the force of fluid pressure acting on the valve member.

4 Claims, 1 Drawing Figure

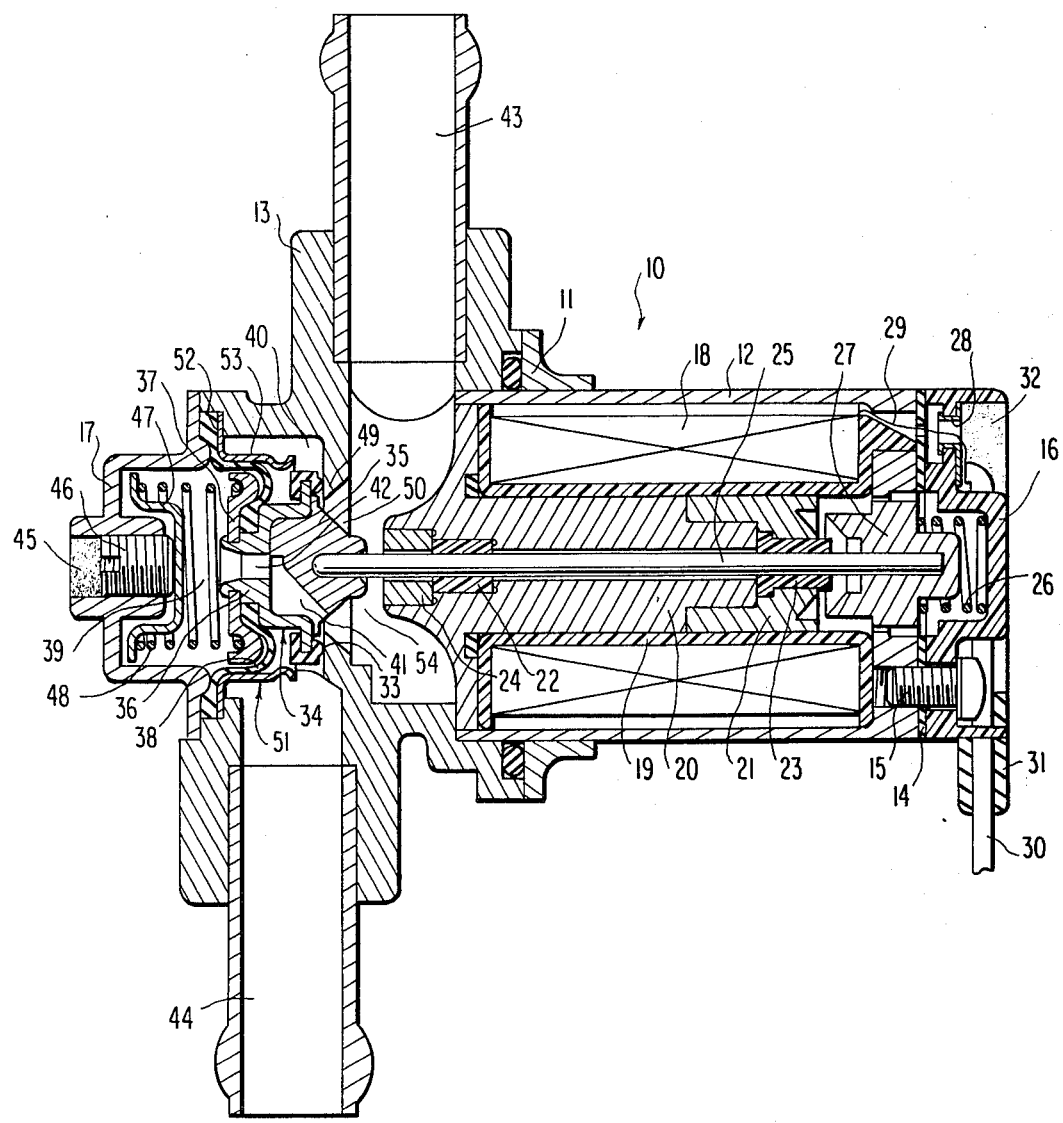

ELECTROMAGNETIC FLOW CONTROL VALVE ASSEMBLY

BACKGROUND OF THE INVENTION

The present invention is directed to an electromagnetic flow control valve assembly and more particularly to an electromagnetic flow control valve assembly which controls a fluid flow between inlet and outlet ports in proportion to the applied electric current flow.

Prior art valve assemblies are known having a valve member to control fluid communication between inlet and outlet ports in response to applied electric current flow. However, in situations where different fluid pressures prevail at the inlet and outlet ports, such as a vacuum pressure at the outlet port and an atmospheric pressure at the inlet port, the vacuum pressure at the outlet port will urge the valve member, which is in its closed position, in one direction due to the difference in pressures at the inlet and outlet ports. Therefore, a problem has been encountered wherein the valve member cannot be moved exactly in proportion to the applied electric current flow especially when there are frequent changes in the vacuum pressure. As a result, the output fluid flow may not be controlled exactly in proportion to the applied electric current flow.

SUMMARY OF THE INVENTION

Accordingly, it is an object of the present invention to provide a new and improved electromagnetic flow control valve assembly which obviates the aforementioned drawbacks associated with conventional electromechanical valve devices.

It is another object of the present invention to provide a new and improved electromagnetic flow control valve assembly which comprises means for balancing fluid pressures at the inlet and outlet ports which prevail against the valve member and means for increasing the durability of the fluid pressure balancing means.

The new and improved electromagnetic flow control valve assembly is comprised of a body having first and second ports, a solenoid coil which receives electric current flow, a valve member positioned within said body and movable in response to electric current flow applied to said solenoid coil to thereby proportionally control fluid communication between said first and second ports, a diaphragm having an inner periphery secured to said valve member and an outer periphery secured to said body, first and second chambers defined by said diaphragm within said body with said first chamber being in communication with said first port and said second chamber being in communication with said second port, the effective area of said diaphragm which is subjected to fluid pressure within said second chamber being the same as that of said valve member which is subjected to fluid pressure within said second chamber to thereby offset the force of fluid pressure acting on said valve member and a protector to protect said diaphragm from damage.

The foregoing and other objects, features and advantages of the invention will be apparent from the following more particular description of a preferred embodiment of the invention as illustrated in the accompanying drawings.

BRIEF DESCRIPTION OF THE DRAWING

The single FIGURE is a cross-sectional view of the electromagnetic flow control valve assembly according to the present invention.

DETAILED DESCRIPTION OF THE INVENTION

An electromagnetic flow control valve assembly 10 is comprised of metal bodies 12 and 13 which are secured to each other by means of a member 11. A cover 16 of resin material is secured to the body 12 through a gasket seal 14 by bolts 15 and a cover 17 of metal material is secured to the body 13 by bolts, not shown. A pair of magnetic members 20 and 21 are located within the body 12 and are secured to each other by any suitable means. A non-magnetic bobbin 19 is positioned about the bodies 20 and 21 and a solenoid coil 18 is disposed on the bobbin 19. A rod 25 is guided for axial sliding movement within members 20 and 21 by means of bearings 22 and 23. The bearing 22 is held in position by means of an annular member 24 secured to one end of member 20 about the rod 25. A magnetic member 27 is secured to the right end of rod 25 and is biased to the left by means of spring 26 located between the magnetic member 27 and the cover 16. While both electrical leads for the solenoid coil 18 are connected to terminals on the end cover 16, only one lead 29 is shown which passes through an aperture in the gasket 14 and a grommet-type terminal 28 for connection to the electrical supply wire 30 which passes through a resilient protective sleeve 31 on the cover 16. A sealing compound 32 completely seals the terminal 28. The terminals may be connected to a computer which receives an electrical signal from an oxygen sensor which is positioned within an engine exhaust manifold and therefore the electric current flow to the solenoid coil 18 is determined by the computer. The body 12, magnetic members 20,21 and 27 comprise a magnetic circuit to generate a magnetic force in proportion to the electric current supplied to the solenoid coil 18 and accordingly, rod 25 is moved to the left in proportion to the applied current flow.

The left end of the rod 25 is secured to a valve member 34 having a resilient valve portion 33 secured thereto. The valve member 34 is comprised of a first portion 35 having a substantially conical surface on the side thereof connected to the rod 25 and a second portion 36 on which the valve portion 33 is secured. The inner periphery of a diaphragm 38 is secured between the second portion 36 of the valve and a support member 37 which is connected to the second portion 36. The outer periphery of the diaphragm 38 is secured between the body 13 and the cover 17. The diaphragm 38 defines chambers 39 and 40. The chamber 39 is connected to an inlet port 43 provided on the body 13 by means of passages 41 and 42 provided in the first and second portions 35 and 36, respectively, of the valve member 34. The chamber 40 is connected to an outlet port 44 provided on the body 13. The valve member 34 is biased to the right by means of a spring 48 one end of which is seated against a retainer 47 within the chamber 39. The force of the spring 48 may be adjusted by varying the position of the retainer 47 by means of the screw 46 threaded through the cover 17. After the necessary adjustment is made, the threaded connection between the screw 46 and the cover 17 is sealed by means of a sealing compound 45. The biasing force of the spring 48 is set larger than that of the spring 26 so that the valve portion 33 of valve member 34 is normally biased into contact with a valve seat 49 provided on the body 13 to interrupt fluid communication between inlet and outlet ports 43 and 44. The inlet port 43 may be in communication with atmospheric pressure while the outlet port 44 may be in communication with the intake manifold of the vehicle engine and therefore atmospheric air is introduced into the intake manifold to control the air-fuel ratio when the rod 25 is moved to the left thereby spacing the valve portion 33 from the seat 49. The passage 50 which is formed in the body 13 is always in communication with the inlet port 43 through the chamber 54 and is in communication with the outlet port 44 when the valve portion 33 is spaced from the seat 49. The passage 50 is provided with a tapered conical configuration which increases in diameter from the chamber 40 to the chamber 54. The tapered configuration of the passage 50 as well as the tapered configuration of the valve portion 35 aide in controlling the rate of fluid communication between the inlet and outlet ports 43 and 44 as the valve member 34 is shifted to the left as viewed in the drawing.

When the valve member 34 is in its closed position, the chamber 39 will be at atmospheric pressure while the chamber 40 is disposed at the negative pressure of the intake manifold. The negative pressure which prevails within the chamber 40 acts on an effective area of the valve member 34 defined by valve portion 33 of the valve member 34 to thereby urge the valve member 34 to the left. However, the diaphragm 38 which is secured to the valve member 34 is urged to the right due to the difference in pressure between the atmospheric pressure in chamber 39 and the negative pressure in chamber 40. Thus, the negative pressure which effectively urges the valve member 34 to the left will be offset by the difference in the pressures which act on the diaphragm 38. Such a construction constitutes a balancing means and no force will be generated to urge the valve member 34 in either direction even when the valve member 34 is in its closed position. Accordingly, valve member 34 which is secured to the rod 25 is moved exactly in proportion to the electric current applied to the coil 18 to thereby proportionally control the air flow from the inlet port 43 to outlet port 44. It is clear that the effective area of the diaphragm 38 may be formed so as to offset forces acting on the valve member 34 with respect to the effective area of the valve member 34 defined by the valve portion 33.

Since the outlet port 44 is connected, for example, to an intake manifold, there is the possibility that foreign matter such as a flame may invade the pressure balancing means, especially upon the occurrence of a backfire, and damage the diaphragm 38. In order to prevent such damage to the diaphragm, the pressure balancing means includes an annular protector sleeve 51 which is provided with a flange for securement between the housing 13 and the cover 17 along with the diaphragm 38. The sleeve 51 has an axially extent sufficient to substantially cover the diaphragm while still permitting the right side of the diaphragm 38 to be exposed to the negative pressure of the intake manifold.

When the solenoid coil 18 receives an electric current flow, the magnetic circuit comprised of the body 12 the elements 20,21 and 27 is completed thereby causing the member 27 to be moved to the left in proportion to the electric current applied to the coil 18. Since the rod 25 is secured at opposite ends to the magnetic member 27 and the valve member 34, the valve portion 33 will be proportionally spaced from the seat 49 to thereby proportionally control fluid communication between the inlet and outlet ports 43 and 44. Thus, atmospheric air will be proportionally introduced into the intake manifold to thereby control the air-fuel mixture.

It is obvious that the electromagnetic flow control valve assembly described above may be applied to other systems. Likewise, while the invention has been particularly shown and described with reference to a preferred embodiment thereof, it will be understood by those in the art that various changes in form and details may be made therein without departing from the spirit and scope of the invention.

What is claimed is:

1. An electromagnetic float control valve assembly comprising a body having first and second ports, a wall within said body having an aperture therethrough located between said first and second ports, a valve member sealingly engageable with said wall about said aperture for controlling fluid communication between said ports, a diaphragm connected betwen said valve member and said body and defining with said body first and second chambers on opposite sides of said diaphragm, a first passage extending through said valve member providing communication between said first port and said first chamber and a second passage providing communication between said second port and said second chamber, the effective area of said diaphragm which is subjected to fluid pressure within said second chamber being the same as that of said valve member which is subjected to fluid pressure within said second chamber to thereby offset the force of fluid pressure acting on said valve member, electromagnetic means operatively associated with said valve member for moving said valve member in proportion to the current applied to said electromagnetic means for proportionally controlling fluid communication between said first and second ports and protective guide means comprised of a cylindrical sleeve disposed within said second chamber with said diaphragm located within said cylindrical sleeve for protecting said diaphragm from foreign matter emanating from said second port into said second chamber, said diaphragm being disposed in rolling contact with said sleeve to guide and accurately position said valve member relative to said aperture.

2. An electromagnetic flow control valve assembly as set forth in claim 1 further comprising spring means for normally biasing said valve member into engagement with said wall and adjustable means for varying the force of said spring means.

3. An electromagnetic flow control valve assembly as set forth in claim 1 further comprising a support member carried by said valve member and engaging said diaphragm to predispose said diaphragm for movement within said cylindrical sleeve.

4. An electromagnetic flow control valve assembly as set forth in claim 1 wherein said aperture is a circular, tapered aperture which decreases in diameter from said first port to said second port and said valve member is provided with a tapered conical projection with the apex thereof extendting into said aperture.

* * * * *